United States Patent
Heitplatz (10) Patent No.: US 9,796,538 B2
(45) Date of Patent: Oct. 24, 2017

(54) CONVEYOR APPARATUS

(71) Applicant: BEUMER GmbH & Co. KG, Beckum (DE)

(72) Inventor: Heino Heitplatz, Drensteinfurt (DE)

(73) Assignee: BEUMER GMBH & CO. KG, Beckum (DE)

( * ) Notice: Subject to any disclaimer, the term of this patent is extended or adjusted under 35 U.S.C. 154(b) by 0 days.

(21) Appl. No.: 13/632,762

(22) Filed: Oct. 1, 2012

(65) Prior Publication Data

US 2013/0084150 A1    Apr. 4, 2013

(30) Foreign Application Priority Data

Oct. 4, 2011  (DE) .................... 20 2011 106 265 U (51) Int. Cl.
| | |
|---|---|
| B65G 1/00 | (2006.01) |
| B65G 47/57 | (2006.01) |
| B65G 17/22 | (2006.01) |
| B65G 17/34 | (2006.01) |
| B65G 35/06 | (2006.01) |
| B65G 47/64 | (2006.01) |
| B65G 47/96 | (2006.01) |
| B65G 47/38 | (2006.01) |

(52) U.S. Cl.
CPC ............. *B65G 47/57* (2013.01); *B65G 17/22* (2013.01); *B65G 17/345* (2013.01); *B65G 35/06* (2013.01); *B65G 47/38* (2013.01); *B65G 47/643* (2013.01); *B65G 47/962* (2013.01)

(58) Field of Classification Search
CPC .................................. B60P 1/43; B65G 65/00
USPC ............ 414/331.06, 331.07, 331.09, 331.11, 414/331.13, 564, 659, 660
See application file for complete search history.

(56) References Cited

U.S. PATENT DOCUMENTS

| | | |
|---|---|---|
| 3,114,332 A | 12/1963 | Bacon et al. |
| 3,648,617 A | 3/1972 | Metzner et al. |
| 3,880,276 A | 4/1975 | Willett, III |
| 4,454,821 A | 6/1984 | Dickhart, III |

(Continued)

FOREIGN PATENT DOCUMENTS

| | | |
|---|---|---|
| DE | 3539723 | 5/1987 |
| DE | 8714976 | 2/1988 |

(Continued)

OTHER PUBLICATIONS

Office Action dated Apr. 12, 2013, in U.S. Appl. No. 13/003,289, 8 pages.

(Continued)

*Primary Examiner* — Saul Rodriguez
*Assistant Examiner* — Willie Berry, Jr.
(74) *Attorney, Agent, or Firm* — Ganz Pollard LLC (57) ABSTRACT

A conveyor apparatus for transporting items along a conveying path from a loading station to a discharge station comprises a car that can be driven in a conveying direction along the conveying path, the car having a frame and a first load-handling device borne by the frame, which is mounted so as to be infinitely adjustable in height in a controlled manner relative to the frame, wherein a second load-handling device is arranged on the frame adjacent to the first load-handling device and is mounted independently thereof so as to be infinitely adjustable in height in a controlled manner.

16 Claims, 7 Drawing Sheets

(56) References Cited

U.S. PATENT DOCUMENTS

| | | | |
|---|---|---|---|
| 4,718,351 | A | 1/1988 | Engle |
| 4,726,456 | A | 2/1988 | Hogsett |
| 4,729,466 | A | 3/1988 | Bollier et al. |
| 4,793,473 | A | 12/1988 | Gilgore et al. |
| 4,951,801 | A | 8/1990 | Mraz |
| 5,090,552 | A | 2/1992 | Fukuyama et al. |
| 5,190,134 | A | 3/1993 | Mraz |
| 5,441,141 | A | 8/1995 | Bonnet |
| 5,611,418 | A | 3/1997 | Helmstetter |
| 5,839,567 | A | 11/1998 | Kyotani et al. |
| 5,901,830 | A | 5/1999 | Kalm et al. |
| 6,082,522 | A | 7/2000 | Polling |
| 6,253,901 | B1 | 7/2001 | Hintz et al. |
| 6,736,254 | B1 | 5/2004 | Fortenbery et al. |
| 6,763,768 | B2 * | 7/2004 | Hart et al. .............. 105/458 |
| 6,832,667 | B1 * | 12/2004 | Kahre et al. ............. 182/127 |
| 7,166,814 | B2 | 1/2007 | Nakanishi et al. |
| 2003/0066736 | A1 | 4/2003 | Edwards et al. |
| 2004/0016679 | A1 | 1/2004 | Schieleit |
| 2004/0216985 | A1 | 11/2004 | Nishihara et al. |
| 2009/0123259 | A1 * | 5/2009 | Barclay .................... 414/462 |
| 2010/0314223 | A1 | 12/2010 | Franz |
| 2011/0108392 | A1 | 5/2011 | Polling |
| 2012/0012438 | A1 | 1/2012 | Heitplatz |

FOREIGN PATENT DOCUMENTS

| | | |
|---|---|---|
| DE | 8714976 U1 | 2/1988 |
| DE | 4104341 | 9/1991 |
| DE | 9302336 U1 | 6/1993 |
| DE | 19719748 | 11/1998 |
| DE | 20205395 | 9/2002 |
| DE | 10127949 | 6/2003 |
| DE | 202008009280 | 9/2008 |
| DE | 102010015299 A1 | 10/2011 |
| DE | 102010033115 | 2/2012 |
| EP | 0633208 A1 | 1/1995 |
| EP | 0700 844 A3 | 5/1996 |
| EP | 0774429 A1 | 5/1997 |
| EP | 1338346 A2 | 8/2003 |
| EP | 1352858 A2 | 10/2003 |
| EP | 2578520 B1 | 12/2015 |
| GB | 2197633 | 5/1988 |
| GB | 2197633 A | 5/1988 |
| GB | 2410482 | 8/2005 |
| SU | 1489855 A1 | 6/1989 |
| WO | 9009944 | 9/1990 |
| WO | 9103324 | 3/1991 |
| WO | 9831617 | 7/1998 |
| WO | WO9847797 | 10/1998 |
| WO | 9855379 A1 | 12/1998 |
| WO | 2012052005 A1 | 4/2012 |

OTHER PUBLICATIONS

PCT Search Report and Written Opinion dated Jun. 15, 2010, in International Patent Application No. PCT/DE2009/01785, accompanied by English-Language Translation; 19 pages.
PCT Search Report and Written Opinion dated Nov. 5, 2009, in International Patent Application No. PCT/DE2009/000737; accompanied by English-Language Translation; 15 pages.
PCT Search Report and Written Opinion dated Mar. 21, 2012, in International Patent Application No. PCT/DE2011/001874; accompanied by English-Language Translation; 21 pages.
German Examination Report dated Oct. 8, 2009, for German Patent Application 10 2009 009 044.4-22, 4 pages.
Office Action dated Feb. 6, 2013, for U.S. Appl. No. 13/201,608, 23 pages.
Final Office Action dated Sep. 23, 2013, for U.S. Appl. No. 13/201,608, 19 pages.
Final Office Action dated Sep. 10, 2013, for U.S. Appl. No. 13/003,289, 9 pages.
Office Action dated Dec. 2, 2013, for U.S. Appl. No. 13/003,289, 8 pages.
Search Report dated Feb. 24, 2014, accompanied by English-Language Translation, for German Application No. 202011106265.5, 7 pages.
Supplemental Search Report Notification dated Feb. 24, 2014, accompanied by English-Language Translation, for German Application No. 202011106265.5, 3 pages.
Office Action dated Apr. 3, 2014, for U.S. Appl. No. 13/201,608, 17 pages.
PCT Search Report dated May 7, 2013, in International PCT application No. PCT/DE2013/00035; accompanied by English-Language Translation; 6 pages.
PCT Written Opinion dated Aug. 9, 2014, in International PCT application No. PCT/DE2013/00035; accompanied by English-Language Translation; 7 pages.
European Patent Office, Examination Report in European Patent No. EP2578520, dated Dec. 30, 2015, 20 pages.

* cited by examiner

CONVEYOR APPARATUS

The invention relates to a conveyor apparatus for transporting items along a conveying path from a loading station to a delivery station, with a car that can be driven in a conveying direction along the conveying path, the car having a frame and a first load-handling device borne by the frame, which is mounted so as to be infinitely adjustable in height in a controlled manner relative to the frame.

Conveyor apparatuses of this kind, which are also used as sorting apparatuses, or sorters, are known from EP 1 338 346 B1, for example.

The problem of the invention is to improve the flexibility and performance of a known conveyor apparatus, especially with regard to the possibility of transporting relatively large and relatively small items with one and the same car, and also with regard to transporting a large number of items per unit/time. It is also intended to be possible to pick up and discharge the items on one or a number of different levels, in order to be able to accommodate a number of loading or discharge stations in a smaller space than hitherto.

In order to solve the above-mentioned problem, the invention proposes adapting a generic conveyor apparatus such that a second load-handling device is arranged on the frame adjacent to the first load-handling device and is mounted independently thereof so as to be infinitely adjustable in height in a controlled manner. This makes it possible to approach any level or height in a loading or discharge station, with either one or both load-handling devices.

It may be contemplated that each load-handling device has at least one load-handling member in the form of a fixed bearing tray, a tilt tray, a belt conveyor or roller track acting in or transverse to the conveying direction.

Drive energy for adjusting the height of the load-handling devices is preferably transmitted to the car in a contact-free manner, such as via induction units arranged along the conveying path.

The load-handling devices may be disposed one behind the other or side-by-side when seen in the conveying direction.

The first load-handling device is preferably mounted in a height-adjustable manner on a first lifting unit, and the second load-handling device is mounted in a height-adjustable manner on a second lifting mechanism, it being possible for the lifting mechanisms to be disposed beneath the load-handling devices, especially centrally beneath the respective load-handling device. In this context, it may be contemplated that the lifting mechanisms are formed with a telescoping or scissor-lift arrangement.

Alternatively, it may be contemplated that the first load-handling device is mounted in a height-adjustable manner on a first lifting mechanism, and the second load-handling device is mounted in a height-adjustable manner on a second lifting mechanism, where each lifting mechanism has a lifting mechanism mast arranged laterally next to the associated load-handling device, the mast being disposed in each case on non-adjacent sides or edges of the first and second load-handling devices, especially on sides or edges of the load-handling device which are farthest apart from one another. A first lifting mechanism may be disposed at the front end of a car and a second lifting mechanism at a rear end of the car.

As a further alternative, it may be contemplated that both load-handling devices are mounted on a double lifting mechanism, which is arranged on a single lifting mechanism mast.

The double lifting mechanism may be arranged centrally between the load-handling devices, the load-handlings device projecting in a cantilevered fashion in opposite directions, especially in and opposite to the conveying direction, or transversely to the conveying direction in each case.

The frame may be T-shaped with an elongate central beam and a cross-beam arranged at one end of the central beam, with a support roller with a horizontal axis of rotation and a guide roller with a vertical axis of rotation mounted at lateral ends of the cross-beam in each case.

It may be contemplated that a number of cars are coupled together in an articulated manner like a train, with a coupling that is in particular rotatable on all sides being disposed in each case between an end of a car adjacent to the cross-beam and an end of a further car opposite the cross-beam. In the case of arrangements on a single plane, a simple coupling is of course sufficient, which merely permits movement about a vertical axis.

Each lifting mechanism may have a positioning drive for approaching any positions desired and a vertically revolving traction drive which can be driven by the positioning drive, such as with a toothed belt or a chain, one run of the traction drive being connected to the load-handling device.

The geared motor is preferably irreversible, so that no holding function or locking is required in order to prevent unwanted lowering.

The double lifting mechanism may have two positioning drives for approaching any positions desired and in each case a traction drive which can be driven by one of the geared motors, one run of a traction drive in each case being connected to a load-handling device.

The load-handling devices are preferably configured symmetrically relative to the double lifting mechanism so that the cantilevered loads balance each other out as far as possible and the lifting mechanism mast is subjected to the least possible bending stress.

It is preferably contemplated that the conveyor apparatus comprises a plurality of loading stations on one or more different loading levels and/or a plurality of discharge stations on one or more different discharge levels.

The invention will now be explained by describing a worked embodiment, wherein

FIGS. 2 and 3 show general perspective views of a first embodiment of a conveyor apparatus of the invention, while FIGS. 1 and 4 show more detailed illustrations seen from the side or, partially cut away, from the front. In a manner known per se, a series of cars 2 can travel in a conveying direction 4 along a conveying path formed here by a guide rail 6 and serve to transport individual items, which have to be picked up at one or more loading stations (not shown) and delivered to one or more discharge stations (not shown).

Figure 3:
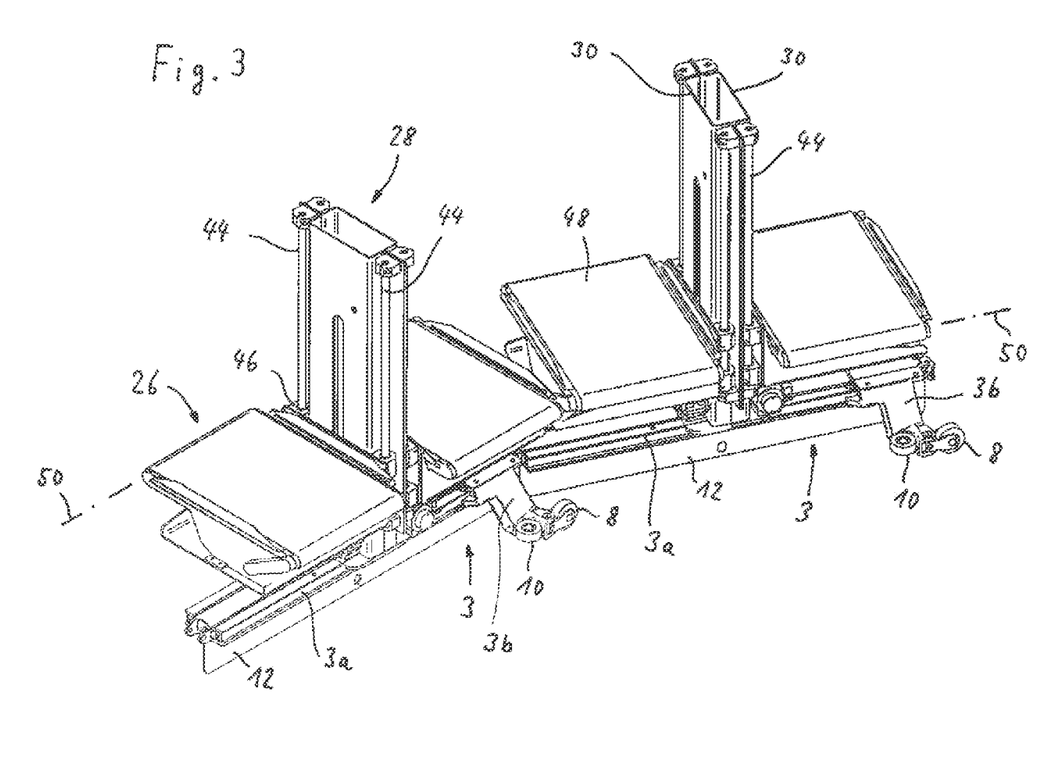
FIG. 3 shows two cars in accordance with FIG. 1 positioned in a bend.
Figure 4:
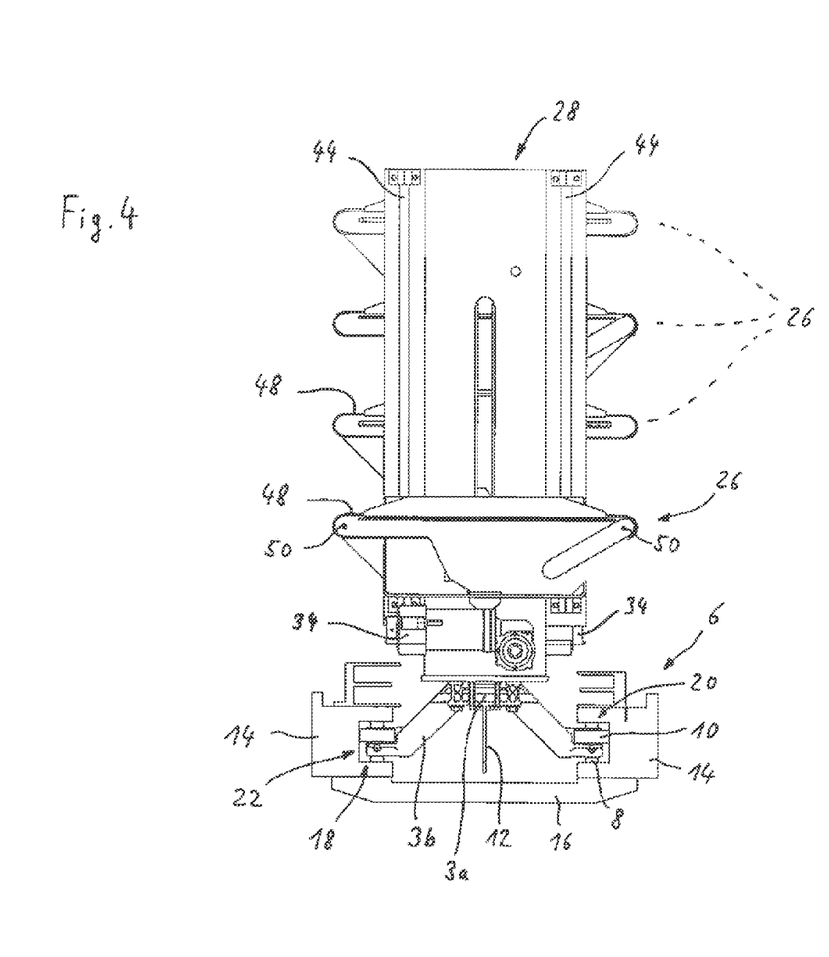
FIG. 4 shows a cross-sectional view of the conveyor apparatus of FIG. 1.

Each car 2 has a frame 3 which is configured as a T-shape over all, and which has an elongate central beam 3*a* and a cross-beam 3*b* located at one end of the central beam 3*a* (FIG. 3), a support roller 8 with a horizontal axis of rotation and a guide roller 10 with a vertical axis of rotation being mounted at lateral ends of the cross-beam in each case, as can also be seen from FIG. 4.

In addition, each car has a drive board 12 extending vertically downwards from the central beam 3*a* for co-operating with a stationary drive means, such as a circulating drag chain, a friction wheel drive or a contact-free induction drive.

The individual cars 2 may either be unconnected and moved at a desired distance from one another by a suitable control means, or they can be coupled together in an articulated manner like a train, with a coupling that is rotatable on all sides, such as a ball joint, being disposed in each case between an end of a car adjacent to the cross-beam and an end of a further car opposite the cross-beam.

As FIG. 4 shows, the cars run in two runners 14, which face each other like mirror images and are C-shaped in cross-section, and which are coupled together by a connector 16 and are mounted at a fixed distance from one another, and which together form the guide rail 6. The support rollers 8 run on lower, horizontal bearing surfaces 18 of the runners 14, while upper horizontal bearing surfaces 20 prevent lifting off. The guide rollers 10 roll on vertical bearing surfaces 22.

Each car 2 carries two load-handling devices 26, which, in the embodiment illustrated in FIGS. 1 to 5, extend from a central lifting mechanism mast 28 in opposite directions (in and opposite to the conveying direction 4). One load-handling device 26 projects from the lifting mechanism mast 28 in the conveying direction 4, while the other load-handling device 26 projects in the opposite direction. Each load-handling device 26 is independently adjustable in height along the vertical extent of the lifting mechanism mast 28, as can be seen from the three cars illustrated in FIGS. 1 and 2. In the car illustrated on the left in FIG. 1 both load-handling devices 26 are located in a bottom-most position; in the middle car, the load-handling device 26 pointing to the right is partially raised; and in the car illustrated on the right, the load-handling device pointing to the right is raised to a top-most position, while the other load-handling device is in a lower position. FIG. 4 shows a first load-handling device at the front and a second load-handling device at the back (behind the lifting mechanism mast 28) in three different positions.

Figure 5:
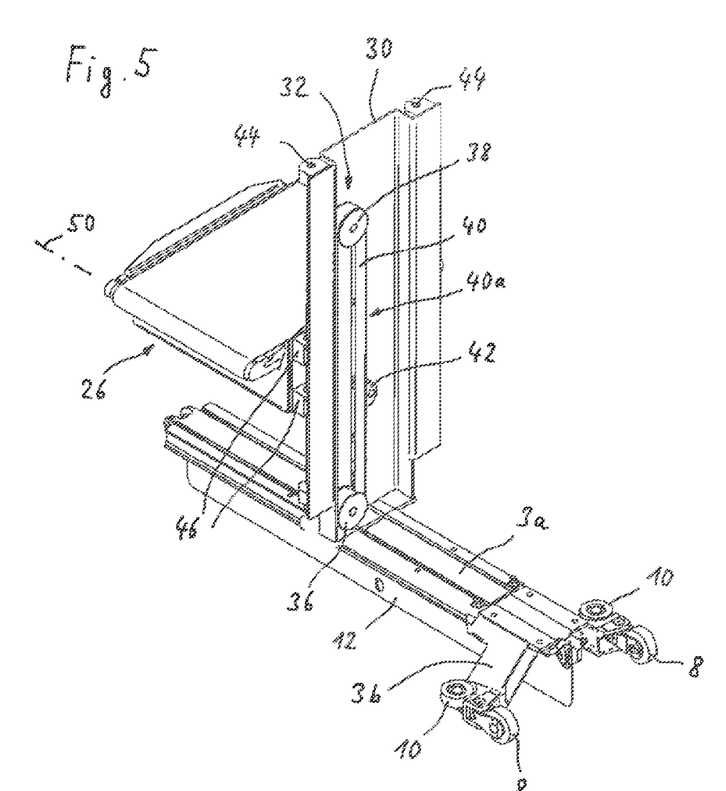
FIG. 5 shows a perspective, opened view of a lifting mechanism of a car of the conveyor apparatus of FIG. 1.

FIGS. 4 and 5 show further details of how the load-handling device 26 is guided to move vertically along the lifting mechanism mast 28. As can be seen in combination with FIG. 3, in which a complete lifting mechanism mast 28 is illustrated in each case, the latter consists of two double-Z-shaped or hat-shaped canted mast profiles 30, which are joined together in a mirror image and connected both to one another and to a frame 3 of each car 2. As can be seen from FIG. 5, there is a cavity between two mast profiles 30 where two traction drives, each in this case being a toothed-belt drive 32, are located, serving to provide the vertical adjustment movement of the two load-handling devices 26 (FIG. 5 shows only one traction drive). Each toothed-belt drive is driven by a geared motor 34 and has a lower drive roller 36 and an upper return roller 38, with a toothed belt 40 stretched between them. One run 40*a* of the toothed belt 40 has a dog 42 fixed to it which is connected to the load-handling device 26 and is responsible for transmitting the drive force from the geared motor to the load-handling device. A positioning drive makes it possible to adjust the respective load-handling device rapidly and precisely.

Each load-handling device 26 is guided in the vertical direction on the mast profile 30 facing it, the guidance being effected in the example illustrated by two parallel and in this case cylindrical guide rods 44, each of which is arranged adjacent to a central, U-shaped, outwardly canted region of the respective mast profile 30. Each load-handling device 26 has four guide members 46 arranged in pairs, which are dimensioned to match the guide rods 44 and ensure that the displacement and guidance take place with virtually no play or friction. While FIG. 5 shows only one mast profile 30 and a load-handling device 26 arranged to travel along it, it goes without saying, with reference to FIG. 3, that a further mast profile and load-handling device of this kind is joined together in a mirror image to the unit illustrated in FIG. 5, as a result of which a double lifting mechanism with a (single) central lifting mechanism mast 28 is formed.

This embodiment allows the greatest possible reduction in the cantilevered loads and bending stresses acting on the lifting mechanism mast 28 because of the lever effect of the load-handling device and the loads picked up, which substantially cancel each other out or balance each other out thanks to the opposing cantilevered arrangement. As a result, the dynamic stress on the components and the total moved mass of the conveyor apparatus is reduced, which leads to cost and energy savings.

In the example illustrated, the load-handling device 26 consists of a cross-belt unit, or cross-belt conveyor, with a cross-conveying belt 48 arranged transversely to the direction 4 which can be driven in either direction, which is guided around lateral return rollers, which are only indicated by their axes of rotation 50. Alternatively, one or both load-handling devices 26 may be formed from a different kind of load-handling member, such as a fixed or tiltable carrying bucket, or by a roller track instead of the cross-conveying belt 48. As a further alternative, the cross-conveying belt 48 illustrated in FIG. 5 could be arranged to be tilted in or opposite to the conveying direction 4; in such a case, the axes of rotation 50 of its return rollers may include an angle of inclination with the conveying direction 4 of between 5 and 45°, for example, and may run parallel to a vertical central longitudinal plane of the respective car 2 pointing in the conveying direction 4, with a stop in a fixed location adjacent to a lowest area of the cross-conveying belt, such an arrangement being used, for example, to pick up cylindrical items, which could otherwise roll away out of control.

Figure 1:
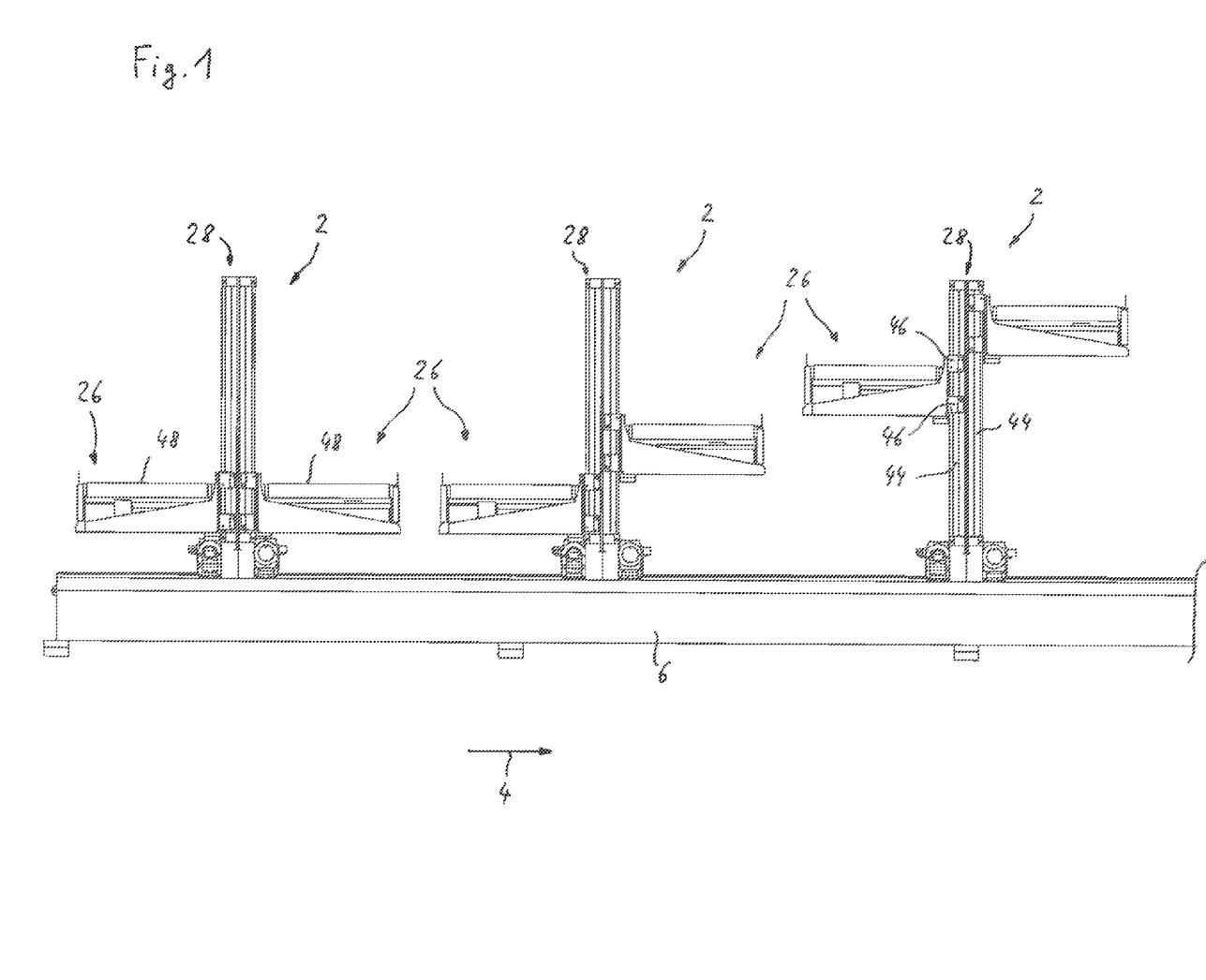
FIG. 1 shows a side view of a first embodiment of the conveyor apparatus of the invention with three cars, FIG. 2
Figure 2:
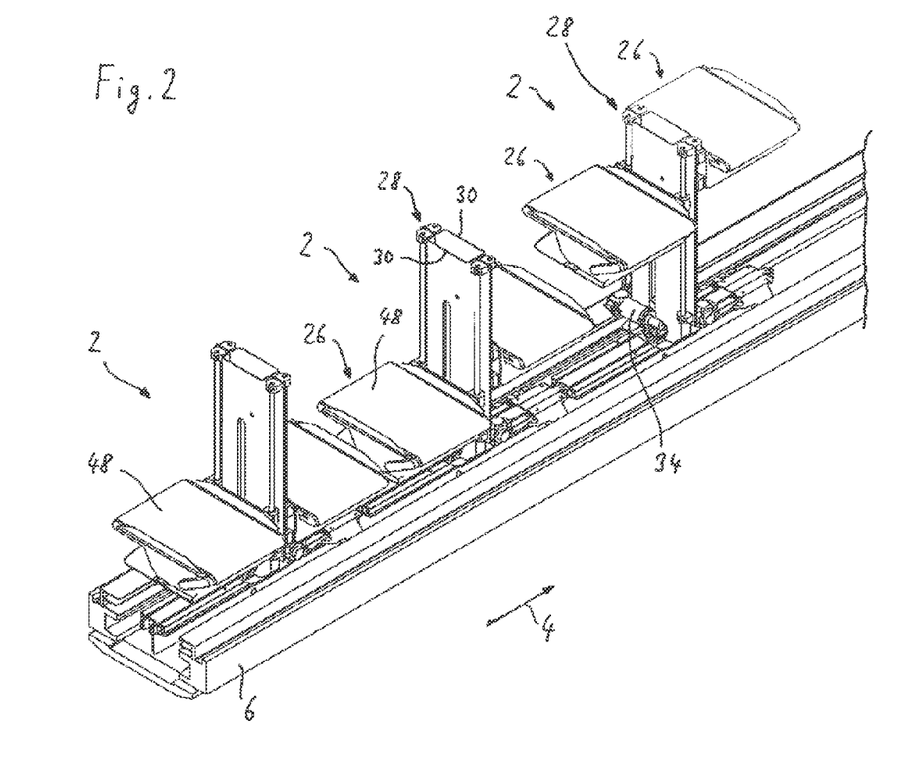
FIG. 2 shows a perspective view in accordance with FIG. 1.

As can be seen from FIGS. 1 to 3, the conveyor apparatus is particularly suitable for establishing a fixed(-distance) coupling between two adjacent cars to receive items the length of which exceeds the length of a load-handling device 26, where in such a case the load-handling devices 26 facing one another on adjacent cars can conveniently be moved to a same level in order to receive a slab or block-shaped item. As FIG. 3 shows, there is a certain disadvantage when travelling round bends in that adjacent cars are swiveled about a vertical axis relative to one another in a bend, causing the load-handling devices 26 facing one another also to be displaced, which may in some cases be undesirable when they are loaded with a relatively long item.

Figure 6:
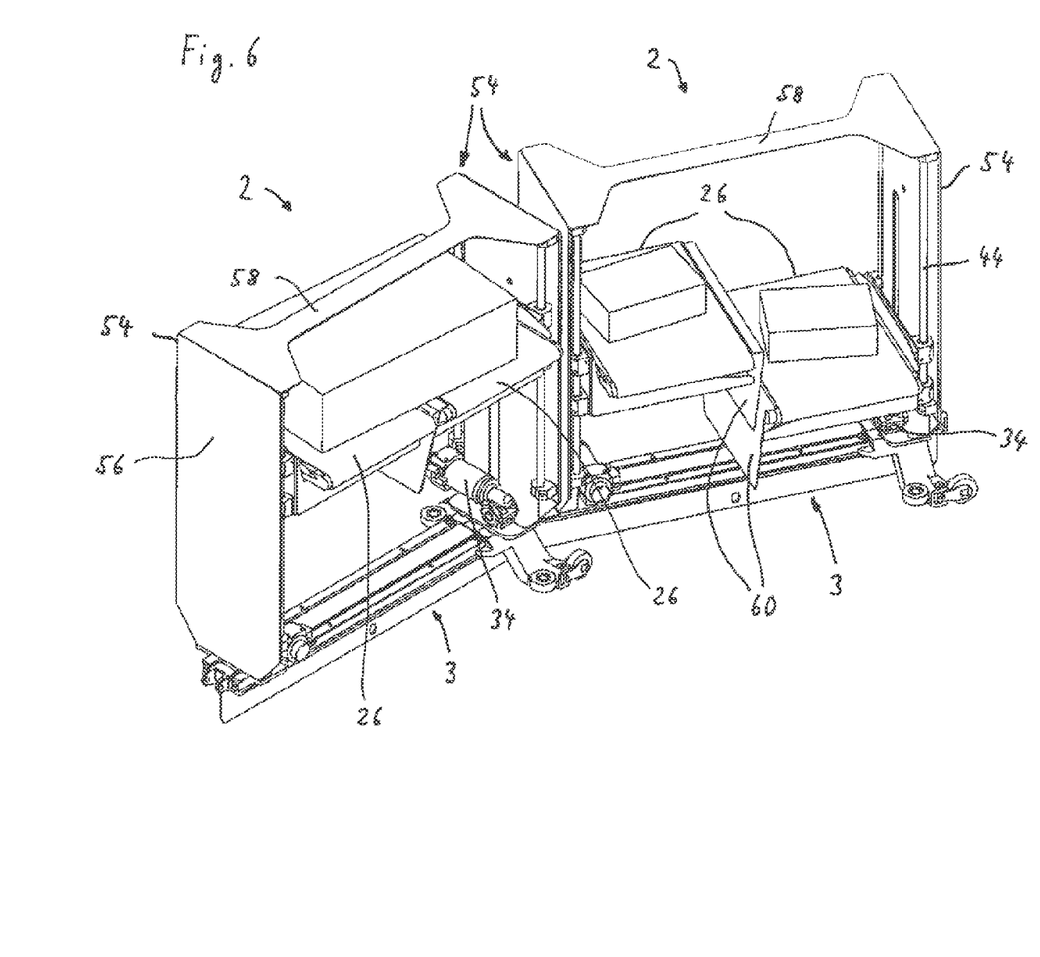
FIG. 6 shows a perspective illustration of two cars of a lifting mechanism of a second embodiment of a conveyor apparatus in accordance with the invention.
Figure 7:
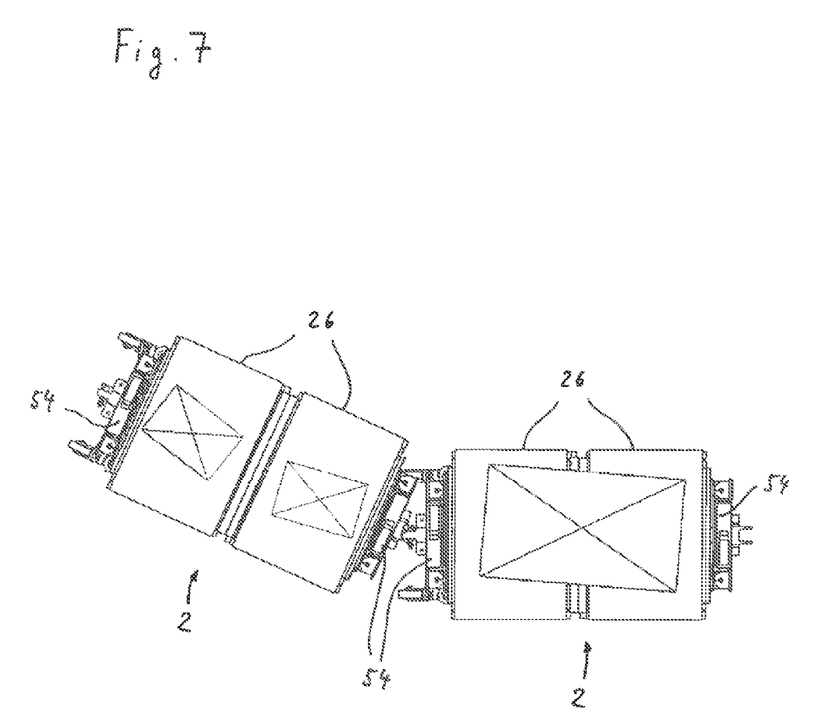
FIG. 7 shows a view of the embodiment according to FIG. 6, seen from above.

FIGS. 6 and 7 show an embodiment in which the above-mentioned disadvantage does not exist. In this embodiment, there is in each case a lifting mechanism mast 54 disposed at the end of the frame 3 of a car 2, on which a single load-handling device 26 is mounted in a height-adjustable manner. The construction of the lifting mechanism mast 54 corresponds substantially to the half or one-sided lifting mechanism mast illustrated in FIG. 5, which is equipped with an end panel 56. The drive with a geared motor 34 and the vertical guide with guide rods 44 correspond to the first embodiment. In order to enhance the tilting stability, the two lifting mechanism masts 54 of a car are connected by an upper bracing member 58.

FIGS. 6 and 7 show that either one item each can be received on the two load-handling devices 26 of a car (right) independently of one another—where the load-handling devices may be at the same or different heights to receive and/or discharge at the same or different heights—, or alternatively a larger item (left) can be received on the two load-handling devices 26 at the same time—where the latter are then conveniently moved to a matching height and are transported together to receive and/or discharge said item, while maintaining the same height.

FIG. 6 also shows that the load-handling devices are equipped at each of their sides or edges facing one another with a skirt 60 extending vertically downwards from the respective side edge, the skirts being parallel and facing each other only a small distance apart, such as less than 10 mm, 5 mm or 2 mm, thus ensuring that any item or parts thereof (belts, cords . . . ) that may possibly be on a load-handling device are not jammed in a gap region between the load-handling device and the adjacent one when the load-handling devices are moved towards one another proceeding from a position in which they are at different heights.

If the rigid skirts 60 are disturbing because of the increased amount of space required in the vertical direction, they may be replaced by, for example, a curtain-like cover which can be rolled up and which is either mounted in the area of the load-handling device and has a rotatable take-up roller arranged transversely to the conveying direction in the form of a roller blind in the region of the frame 3, or it could be the other way round, with a fixed attachment in the area of the frame and a take-up roller on the load-handling device.

In the first embodiment too, a cover of this kind may be provided for the gap between load-handling devices facing one another on adjacent cars 2, though this does not require any greater effort, because of the relative movements in bends.

LIST OF REFERENCE NUMERALS

2 Car
3 Frame
3a Central beam
3b Cross-beam
4 Conveying direction
6 Conveying rail (conveying path)
8 Support roller
10 Guide roller
12 Drive board
14 Runner
16 Connector
18 Lower horizontal bearing surface
20 Upper horizontal bearing surface
22 Vertical bearing surface
26 Load-handling device
28 Lifting mechanism mast
30 Mast profile
32 Toothed-belt drive (traction drive)
34 Geared motor
36 Drive roller
38 Return roller
40 Toothed belt
42 Dog
44 Guide rod
46 Guide member
48 Cross-conveying belt
50 Axis of rotation
54 Lifting mechanism mast
56 Cover panel
58 Bracing member
60 Skirt

The invention claimed is:

1. A conveyor apparatus for transporting items along a conveying path from a loading station to a discharge station, with a car that can be driven in a conveying direction along the conveying path, the car having a frame and a first load-handling device linearly borne by the frame, which first load-handling device is mounted along a first vertical guide so as to be infinitely adjustable in height in an orthogonal direction relative to the conveying direction and in a controlled manner relative to the frame, wherein a second load-handling device is linearly borne by the frame, positioned adjacent to the first load-handling device, and mounted independently thereof along a second vertical guide so as to be infinitely adjustable in height in the orthogonal direction in a controlled manner relative to the frame, wherein-handling device is mounted in a height-adjustable manner to a first lifting mechanism, and the second load-handling device is mounted in a height-adjustable manner to a second lifting mechanism, where each lifting mechanism has a lifting mechanism mast arranged laterally next to the associated load-handling device, said mast being disposed in each case on non-adjacent sides or edges of said first and second load-handling devices, wherein each of said first and second load-handling devices is cantilevered from the respective mast.

2. The conveyor apparatus as claimed in claim 1, wherein each load-handling device has at least one load-handling member in the form of a fixed carrying bucket, a tiltable bucket, a belt conveyor acting in or transversely to the conveying direction, or a roller track.

3. The conveyor apparatus as claimed in claim 1, wherein the load-handling devices are disposed one behind the other or side-by-side when seen in the conveying direction.

4. The conveyor apparatus as claimed in claim 1, wherein the lifting mechanisms are disposed beneath the load-handling device.

5. The conveyor apparatus as claimed in claim 4, wherein the lifting mechanisms are configured with a telescoping or scissor-lift arrangement.

6. The conveyor apparatus as claimed claim 4, wherein each lifting mechanism has a positioning drive for approaching any positions desired and a vertically revolving traction drive which can be driven by said positioning drive, one run of said traction drive being connected to the load-handling device.

7. The conveyor apparatus as claimed in claim 4, wherein the lifting mechanisms are centrally disposed beneath the respective load-handling device.

8. The conveyor apparatus as claimed in claim 1, wherein the first lifting mechanism is disposed at a front end of the car and the second lifting mechanism is disposed at a rear end of said car.

9. The conveyor apparatus as claimed in claim 1, wherein the car comprises a first car having a cross-beam, the conveyor apparatus further comprising a second car coupled together with the first car in an articulated manner with a coupling that is rotatable on all sides disposed between an end of the first car adjacent to the cross-beam and an end of the second car opposite the cross-beam.

10. The conveyor apparatus as claimed in claim 1, further comprising a plurality of loading stations, wherein at least two of the loading stations are positioned on different loading levels.

11. The conveyor apparatus as claimed in claim 1, further comprising a plurality of discharge stations, wherein at least two of the discharge stations are positioned on different discharge levels.

12. The conveyor apparatus as claimed in claim 1, wherein the frame is configured to be T-shaped with an elongate central beam and a cross-beam arranged at one end of the central beam, with a support roller with a horizontal axis of rotation and a guide roller with a vertical axis of rotation mounted at lateral ends of the cross-beam in each case.

13. A conveyor apparatus for transporting items along a conveying path from a loading station to a discharge station, with a car that can be driven in a conveying direction along the conveying path, the car having a frame and a first load-handling device borne by the frame, which is mounted so as to be infinitely adjustable in height in a controlled manner relative to the frame, wherein a second load-handling device is arranged on the frame adjacent to the first load-handling device and is mounted independently thereof so as to be infinitely adjustable in height in a controlled manner, wherein the frame is configured to be T-shaped with an elongate central beam and a cross-beam arranged at one end of the central beam, with a support roller with a horizontal axis of rotation and a guide roller with a vertical axis of rotation mounted at lateral ends of the cross-beam in each case.

14. A conveyor apparatus for transporting items along a conveying path from a loading station to a discharge station, the conveyor apparatus comprising:
a plurality of loading stations provided at one or more loading levels;
a guide rail defining a conveying path; and
a car that can be driven in a conveying direction along the conveying path, wherein the car has a frame and a first load-handling device borne by the frame, wherein the first load-handling device is mounted on a first vertical lifting mechanism so as to be infinitely adjustable in height in an orthogonal direction relative to the conveying direction and in a controlled manner relative to the frame, wherein a second load-handling device is arranged on the frame adjacent to the first load-handling device and is mounted independently thereof on a second vertical lifting mechanism so as to be infinitely adjustable in height in the orthogonal direction relative to the conveying direction and in a controlled manner relative to the frame, wherein each of the lifting mechanisms is disposed beneath the respective load-handling device and in a central mast positioned between the first load-handling device and the second load-handling device.

15. The conveyor apparatus as claimed in claim 14, further comprising a plurality of discharge stations, each being positioned on a selected discharge level.

16. The conveyor apparatus as claimed in claim 14, wherein the one or more loading levels comprises a plurality of loading levels, wherein at least two of the loading stations are positioned at different ones of the loading levels.

* * * * *